United States Patent [19]
Gött et al.

[11] Patent Number: 4,466,304
[45] Date of Patent: Aug. 21, 1984

[54] POWER TRANSMISSION

[75] Inventors: Hans Gött; Josef Ritter; Gerhard Ritter; Klaus Ritter, all of Graz, Austria

[73] Assignee: EVG Entwicklungs-und Verwertungs-Gesellschaft m.b.H, Graz, Austria

[21] Appl. No.: 398,286

[22] Filed: Jul. 14, 1982

[30] Foreign Application Priority Data

Jul. 31, 1981 [AT] Austria ................. 3382/81

[51] Int. Cl.³ .............. F16H 3/22; F16D 21/02
[52] U.S. Cl. ..................... 74/346; 74/340;
74/688; 192/48.91; 192/87.14
[58] Field of Search ............ 74/325, 331, 333, 335,
74/342, 343, 344, 345, 346, 366, 368, 369, 370,
373, 374, 375, 688; 192/48.91, 48.9, 48.8, 20, 21,
87.14

[56] References Cited

U.S. PATENT DOCUMENTS

| | | | |
|---|---|---|---|
| 2,251,213 | 7/1941 | Lanphere | 74/346 |
| 2,261,898 | 11/1941 | Barkeij | 74/346 |
| 2,309,864 | 2/1943 | Patterson | 74/370 |
| 4,018,106 | 4/1977 | Uozumi et al. | 74/688 |
| 4,312,243 | 1/1982 | Gott et al. | 74/346 |

FOREIGN PATENT DOCUMENTS 19609 11/1980 European Pat. Off. .......... 74/346

Primary Examiner—Allan D. Herrmann
Assistant Examiner—Stephen B. Andrews
Attorney, Agent, or Firm—Ernest F. Marmorek

[57] ABSTRACT

The power transmission has two pairs of coaxial shafts (1,15 and 2,30 respectively) which are aligned with one another and are displaceable relative to one another and carry at their adjacent ends a coupling disc (3,16 and 4,31 respectively) upon each, which can be coupled at option by a central freely rotatable coupling body (12). In order also to enable direct connection of the driving shaft (1) to the driven shaft (2), one shaft each of the two aligned pairs of shafts (1,15 and 2,30 respectively) is formed by the driving shaft and the driven shaft respectively (1 and 2 respectively) and the other shaft is made as a coaxial hollow shaft (15 and 30 respectively) and is coupled via a gear wheel (23 and 38 respectively) and a back gear (26 and 51 respectively) to a gear wheel (22) on the driving shaft (1), or respectively coupled or able to be coupled via a gear wheel (50) to the driven shaft (2).

7 Claims, 3 Drawing Figures

POWER TRANSMISSION

The invention relates to a power transmission having two pairs of coaxial shafts which are aligned with one another and are displaceable by means of a control in the axial direction relatively to one another, and at the adjacent ends of which a coupling disc is arranged upon each, and which can be coupled together in selectable combinations by means of a central coupling body supported so as to be freely displaceable and rotatable between the two pairs of coupling discs. Such a transmission is hereinafter referred to as of the kind described.

A transmission of this kind is known from published European Patent Application No. 0019609. In the case of this known transmission, the shafts, which can be displaced relatively to one another by means of a control and can be coupled in different combinations via the central coupling body, lie in a back gear, which is connected via gear wheels to driving and driven shafts of the transmission. Consequently at any possible transmission ratio of this transmission, that is, even when the driving and driven shafts are to have the same speed of rotation, the flow of power runs first of all from the driving shaft to a countershaft, then via the coupling to a second countershaft and only from the latter to the driven shaft. This flow of power has the effect that in every gear, but in particular in the higher gears, transmission losses arise which might be avoided, or reduced, if a direct connect between the driving and driven shafts were possible.

The invention is therefore concerned with the problem of constructing a transmission of the kind described, in such a way that in one gear ratio a direct connection results between the driving and the driven shafts.

According to the invention, a power transmission of the kind described is characterized in that the first pair of coaxial shafts consists of a driving shaft and a hollow shaft surrounding the driving shaft, these two coaxial shafts being connected together via a gear wheel on each and a back gear in a first predetermined fixed transmission ratio, and that the second pair of coaxial shafts consists of a driven shaft and a second hollow shaft surrounding the driven shaft, the second hollow shaft being connected via a third gear wheel and a second back gear to a fourth gear wheel which is coupled or can be coupled to the driven shaft in a second predetermined fixed transmission ratio.

In the case of a transmission constructed in this way, during direct connection of the driving and driven shafts both back gears run idle and the transmission of power is effected directly from the driving shaft to the driven shaft.

In the case of one embodiment in which the fourth gear wheel, associated with the driven shaft, is not coupled permanently to this shaft but can be coupled by means of the control, according to a further development of the invention, a third hollow shaft likewise surrounding the driven shaft coaxially may be provided to be driven by the fourth gear wheel and to be coupled to the driven shaft via a, preferably positive mechanical, coupling.

From this follows inter alia the possibility of making the transmission with reverse gears. For this purpose the driven shaft only needs to be able to be coupled alternatively via one or other of two of the fourth gear wheels with a normal one of two of the second back gears, or with the other of the second back gears which reverses the direction of rotation, respectively.

A particular advantage results if between the third hollow shaft which surrounds the driven shaft coaxially, and the associated fourth gear wheel a free wheel is provided, by means of which the driven shaft can be driven by the gear wheel only in the sense of a forwards rotation. By this measure is achieved that in the case of those transmission ratios in which the transmission of the driving torque is effected by the central coupling body which is supported to be freely displaceable and rotatable, directly to the coupling disc driving the driven shaft, the two hollow shafts surrounding the driven shaft and the back gear connecting these two hollow shafts are not being driven at all, whereby the internal losses in the transmission as also the noise level are reduced.

A further improvement results if between the third hollow shaft, which surrounds the driven shaft and the associated fourth gear wheel a friction coupling is provided, which overrides and bridges across the free wheel, and can be engaged and disengaged. In this case it is in addition possible to use the engine for braking the driven shaft.

Finally through the interposition of an hydraulic coupling in at least that power transmission path which is associated with bottom gear, the occurrence of load shocks during gear changes may be reduced.

The invention is explained more closely below by reference to the accompanying drawings, in which.

Figure 1:
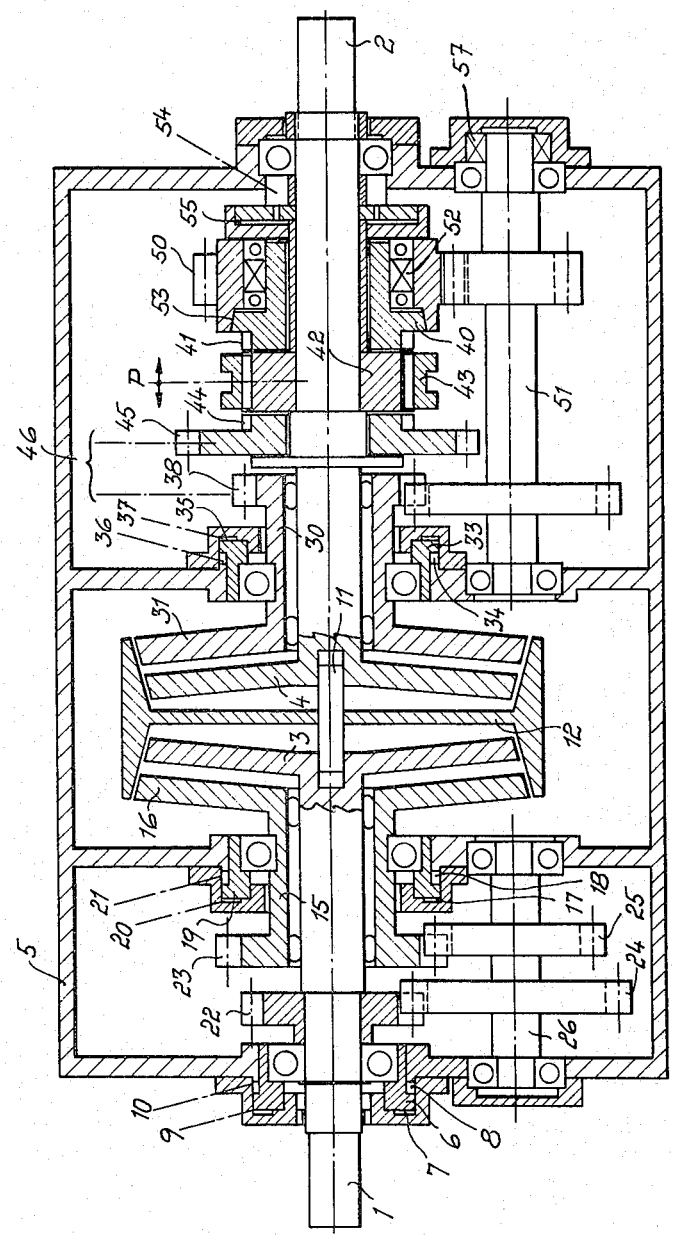
FIG. 1 shows in longitudinal section a transmission in accordance with the invention having four forward gears and two reverse gears.

In accordance with FIG. 1 a driving shaft 1 is arranged in alignment with a driven shaft 2. A coupling disc 3 is connected rigidly to the free end of the driving shaft 1, and likewise a coupling disc 4 is rigidly connected to the free end of the driven shaft 2. A pin 11 supported in holes drilled axially in the adjacent ends of the shafts 1 and 2 can shift axially with respect to both shafts and carries a central coupling body 12.

Whilst the driven shaft 2 is supported in a fixed position in the transmission housing 5, the driving shaft 1 can be displaced in its axial direction in the transmission housing 5, the displacement being brought about by means of an annular piston 6. Together with correspondingly shaped parts of the transmission housing 5, the piston 6 defines two annular chambers 7,8 which may be supplied with pressure medium via pipes 9,10 which are only suggested in FIG. 1.

The two faces of the piston 6 bounding the annular chambers 7,8 are of different sizes, that is, the face of the piston bounding the chamber 7 is larger than that which bounds the chamber 8. Therefore upon acting upon both chambers 7,8 simultaneously with pressure medium, the driving shaft 1 gets displaced in the direction towards the central coupling body 12, but upon relieving the chamber 7 of pressure it moves in the opposite direction. The axial movement of the driving shaft 1 can therefore be controlled by alteration of the pressure in the chamber 7 alone.

A hollow shaft or quill 15, which carries at one end a coupling disc 16, surrounds the driving shaft 1 coaxially and is supported so as to be freely rotatable and freely displaceable in the axial direction with respect to it. By means of a second piston 19 which defines annular chambers 17,18 axial displacement of the hollow shaft 15 may be brought about. The chambers 17 and 18 correspond in their operations with the chambers 7 and 8 respectively, while the chambers 17,18 may be supplied with pressure medium via pipes 20,21 which are only suggested.

A gear wheel 22 is arranged to rotate with the driving shaft 1 and likewise a gear wheel 23 is fixed to the hollow shaft 15 so as to rotate with it. The two gear wheels 22,23 are in permanent mesh with gear wheels 24,25 on a lay shaft of a back gear 26, whereby the two coaxial shafts 1 and 15 are connected together in a first predetermined fixed transmission ratio.

The driven shaft 2 is surrounded coaxially by a hollow shaft or quill 30 which carries at one end a coupling disc 31. The hollow shaft 30 is supported with respect to the central coupling body 12 in mirror image to the hollow shaft 12 and can be displaced axially. For this purpose it cooperates in the way already explained with an annular piston 33 which separates from one another two chambers 34,35 that may be supplied with pressure medium via pipes 36,37, which are only suggested. The cross sectional area of the piston 33 which is acted upon by pressure medium in the chamber 35 is greater than the cross sectional areas of piston acted upon by pressure medium in the chambers 7 and 17 respectively in order to exclude with certainly simultaneous contact of the coupling discs 4 and 31 with the central coupling body 12. At the end of the hollow shaft 30 remote from the coupling disc 31 a gear wheel 38 is arranged to rotate with it.

A third hollow shaft or quill 40, likewise surrounding the driven shaft 2 coaxially, carries a gear ring 41. An internally toothed gear ring 43 on a gear wheel 42, which is connected to the driven shaft so as to rotate with it, can be displaced, e.g., by means of a control lever or by a piston which can be acted upon by pressure medium, in the axial direction of the driven shaft 2 in the sense of the double arrow P, so that it may be brought into engagement with the gear ring 41 in order to connect the hollow shaft 40 rigidly to the driven shaft 2. Upon displacement in the opposite direction the internally toothed gear ring 43 comes into engagement with a gear ring 44 on a gear wheel 45, which is supported so as to be able to rotate freely round the driven shaft 2 and which, via a back gear 46 which reverses the direction of rotation but is only suggested, produces with the gear wheel 38 a driving connection in the sense of a reverse rotation of the driven shaft.

A gear wheel 50, which, in the embodiment illustrated, surrounds the hollow shaft 40 coaxially, is connected via a back gear 51 to the gear wheel 38 in a second predetermined fixed transmission ratio.

In the case of the preferred embodiment illustrated, a free wheel 52 is provided between the hollow shaft 40 and the gear wheel 50 and is so constructed that in the case of relative movement of the gear wheel 50 with respect to the hollow shaft 40 in the sense of a forwards rotation of the driven shaft 2, it produces a positive connection between the gear wheel 50 and the hollow shaft 40, but on the contrary in the case of a relative movement in the opposite sense, ensures free mobility of these two parts independently of one another.

According to a further advantageous feature the gear wheel 50 can be displaced relatively to the hollow shaft 40 by a small amount in the axial direction of the driven shaft 2, and the hollow shaft 40 as well as the gear wheel 50 are provided with cooperating friction coupling faces 53. The axial displacement is brought about by means of pressure medium introduced into an annular chamber 55 via a pipe 54 which is only suggested. After actuation of this coupled which bridges over the free wheel 52, the driven shaft 2 can be braked by the engine. The release of the coupling is effected by means of return springs which are not shown.

For all forward gears the gear ring 43 is first of all brought into engagement with the gear ring 41 and the gear wheel 50 is thereby coupled to the driven shaft 2. There then result for the individual forward gears the following control processes and operative connections:

1st Gear: The chambers 17 and 35 are acted upon by pressure medium via the pipes 20 and 37 respectively. The hollow shafts 15 and 30 thereupon move in opposite senses along the driving shaft 1 and the driven shaft 2 respectively and the coupling discs 16 and 31 are connected frictionally by the freely displaceable coupling body 12. The flow of power then goes from the shaft 1 via the gear wheels 22-24-25-23 including the back gear 26, the shaft 15, the coupling parts 16-12-31, the hollow shaft 30, the gear wheel 38, the back gear 51, the gear wheel 50, the free wheel 52, the hollow shaft 40, the gear rings 41,43 and the gear wheel 42 and thence to the driven shaft 2, that is, it has essentially the course:
1-22-26-23-15-16-12-31-38-51-50-(52-40-41-43-42)-2.

2nd Gear: The chambers 9 and 35 are acted upon by pressure medium, whereby the coupling parts 3-12-31 are connected frictionally and the flow of power 1-3-12-31-38-51-50-(52-40-41-43-42)-2 results.

3rd Gear: The chamber 17 is acted upon by pressure medium, whereby the coupling disc 3 presses the freely displaceable coupling body 12 against the coupling disc 4 fixed to the shaft 2 and the flow of power 1-22-26-23-15-16-12-4-2 results.

Since in the case of this operative connection the driven shaft 2 gets driven directly in the sense of a forwards rotation, the connection is released in the free wheel 52 between the hollow shaft 40 and the gear wheel 50, and the parts 31-30-38-51-50 remain at rest.

4th Gear: The chamber 9 is acted upon by pressure medium, whereby the coupling disc 3 connects the freely movable coupling body 12 frictionally to the coupling disc 4 and in the direct drive the flow of power 1-3-12-4-2 results. The free wheel acts in the same way as in the 3rd Gear.

Figure 2:
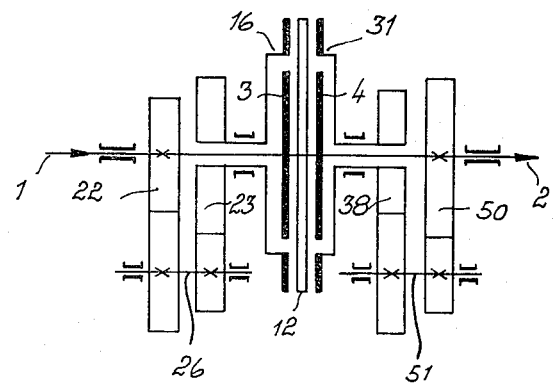
FIG. 2 shows diagrammatically in longitudinal section a transmission having only four forward gears; and, FIG. 3 is a partial section through a transmission corresponding with FIGS. 1 or 2, having an hydraulic coupling interposed in the path of flow of power in the low gears.

In the case of a power transmission without any reverse, in accordance with the diagrammatic illustrations in FIG. 2 the gear wheel 50 is connected rigidly to the driven shaft 2, so that the parts 40 to 45 and 52 of the transmission are omitted and the paths of the flow of power in the 1st and 2nd Gear are simplified through the omission of the sections previously put in brackets.

In the case of the preferred embodiment as in FIG. 1 the transmission may still be driven with two reverse gears if the gear ring 43 and 44 are brought into engagement with one another. If the side of the transmission lying on the left of the coupling is moreover connected as in the 1st Gear, the output is effected slowly in a first reverse gear via the gear wheel 38, the back gear 46 which reverses the direction of rotation but is only indicated, and the gear wheel 45, but upon connecting the left hand side of the transmission as in the 2nd Gear the output via the same parts on the right hand side of the transmission is effected at a higher speed in a second reverse gear.

The central coupling body 12, supported to be freely displaceable and rotatable, may as indicated in FIG. 2 have a disc shape but it is preferably constructed in accordance with FIG. 1 with double-sided conical coupling faces, in order to be able to arrange the peripheral coupling faces of the coupling discs 3,4,16 and 31 at approximately the same distance from the shafts 1 and 2 and thereby to keep the frictional forces at all of the coupling faces, which occur during the transmission of power, approximately equally large.

Figure 3:
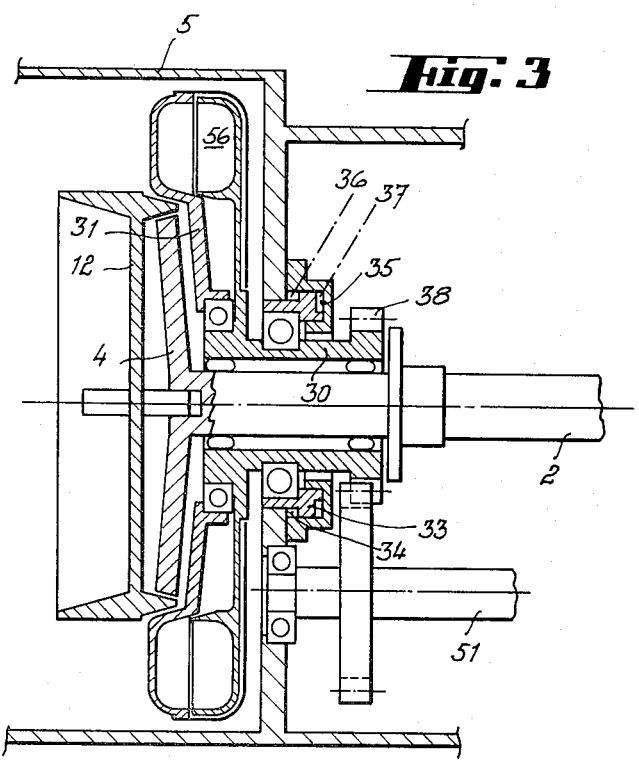

Under certain circumstances it may prove advantageous to interpose a hydraulic coupling 56 at least in the path of flow of power associated with the lowest gears, in the present example, say, between the coupling disc 31 and the hollow shaft 30 in FIG. 3, in order to be able to take up gently loading shocks occuring during gear changes in these gears. In FIG. 3 the coupling disc 31 is made as a component of the pump of a hydraulic coupling 56 which is shown only diagrammatically, as it is in itself known, the turbine portion of it being connected to the hollow shaft 30.

Again, in the case of the employment of the transmission on motor vehicles it is advantageous for the prevention of rolling away of the vehicle on a slope with the transmission in neutral, to provide on the lay shaft of the back gear 51 a sprag 57 which like a free wheel allows turning of the shaft of the back gear 51 only in one direction. If, for example, the gear rings 41 and 43 are in engagement and if at the same time none of the chambers 7,17,35 are being acted upon by pressure medium, then none of the coupling parts 3,4,12,16,31 is in contact with any other and the transmission is therefore in neutral. If the vehicle now had the tendency to roll backwards, the shaft 51 would turn against its normal direction of drive and the sprag would catch and prevent the rotation. Thus the vehicle could not roll back. The same would occur if the gear rings 43 and 44 were in engagement; in this case the vehicle could not roll forwards. Depending upon the position of the gear ring 43, therefore, the sprag prevents rolling away of the vehicle when parked on a slope.

For the control of the transmission any mechanical, pneumatic or hydraulic controls, preferably with electrical triggering, may be employed. A description of these circuits which do not directly form constituents of the invention, is superfluous because essentially they are well known.

We claim:

1. A power transmission having first and second pairs of coaxial shafts which are aligned with one another and have ends adjacent to one another, means mounting said shafts for displacement relatively to one another in the axial direction, a control for controlling such displacement, a coupling disc arranged upon each of said adjacent shaft ends, and a central coupling body supported to be freely displaceable and rotatable between said coupling discs for coupling said shafts together in selectable combinations, wherein said first pair of coaxial shafts consists of a driving shaft and a hollow shaft surrounding said driving shaft, said first pair of coaxial shafts being connected together via a gear wheel on each of said first pair of coaxial shafts and a back gear in a first predetermined fixed transmission ratio, and wherein said second pair of coaxial shafts consists of a driven shaft and a second hollow shaft surrounding said driven shaft, said second hollow shaft being connected via a third gear wheel and a second back gear to a fourth gear wheel which is adapted to be coupled to said driven shaft in a second predetermined fixed transmission ratio.

2. A power transmission as in claim 1, wherein there is provided, surrounding said driven shaft coaxially, a third hollow shaft, which is adapted to be driven by said fourth gear wheel and to be coupled to said driven shaft via a coupling.

3. A power transmission according to claim 1, wherein there are two of said fourth gear wheels and two of said second back gears and means are provided for coupling said driven shaft alternatively via one or other of said fourth gear wheels with a normal one of said second back gears or with the other of said second back gears which reverses said direction of rotation, respectively.

4. A power transmission according to claim 2, wherein a free wheel is provided between said third hollow shaft and said fourth gear wheel, said free wheel being adapted to cause said driven shaft to be driven by said fourth gear wheel only in the forward direction of rotation.

5. A power transmission according to claim 4, wherein, between said third hollow shaft and said fourth gear wheel, there is provided a friction coupling which overrides said free wheel and is adapted to be engaged and disengaged.

6. A power transmission as in claim 1, wherein an hydraulic coupling is interposed in at least a power transmission path associated with a bottom gear ratio.

7. A power transmission as in claim 1, wherein said second back gear is equipped with a sprag to allow only one way rotation thereof.

* * * * *